INVENTOR.
RONALD M. FIANDT
BY PENDLETON, NEUMAN SEIBOLD & WILLIAMS
ATTORNEYS

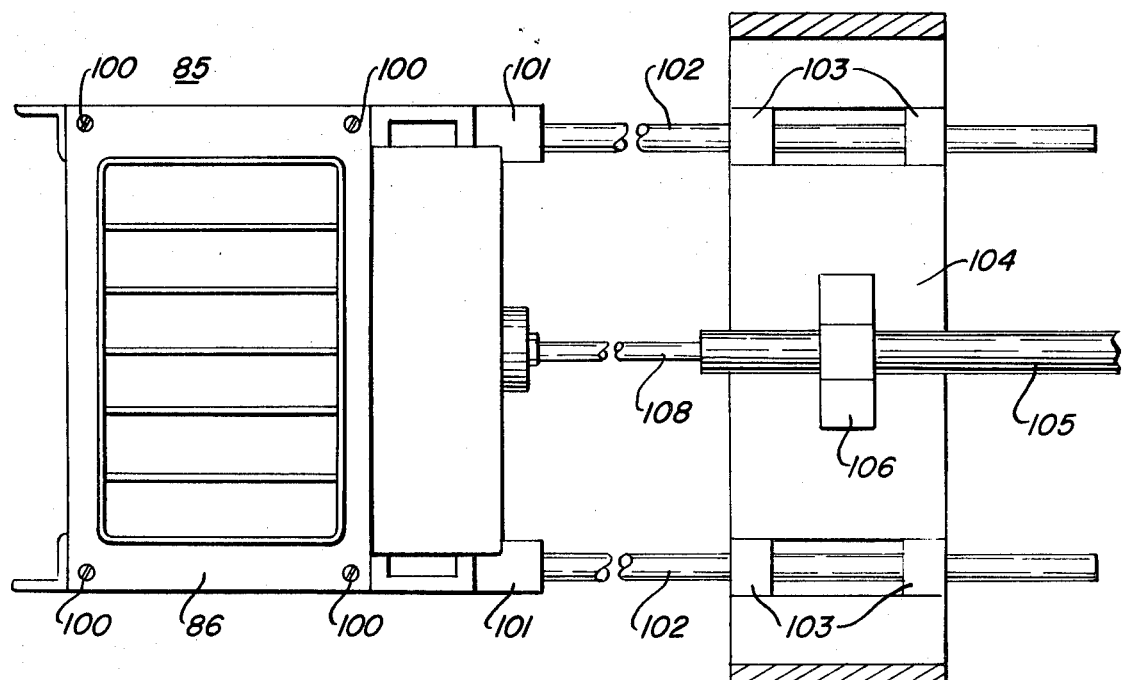
Fig. 5
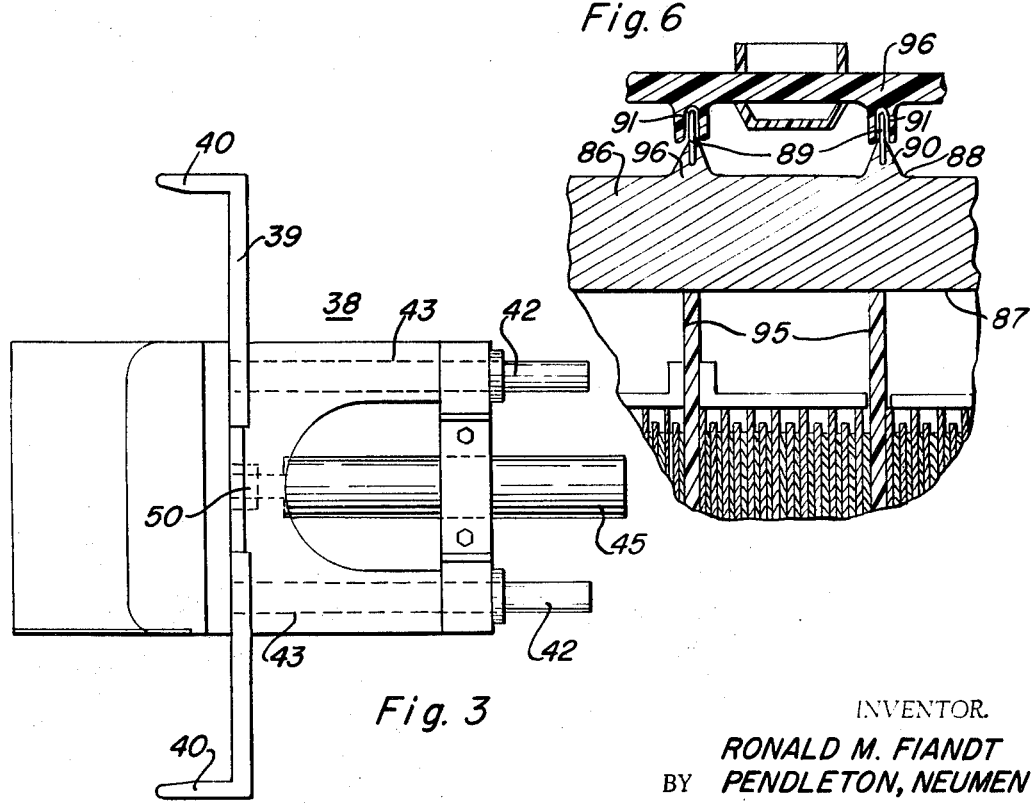
Fig. 6
Fig. 3

INVENTOR.
RONALD M. FIANDT
BY PENDLETON, NEUMAN
SEIBOLD & WILLIAMS

ATTORNEYS

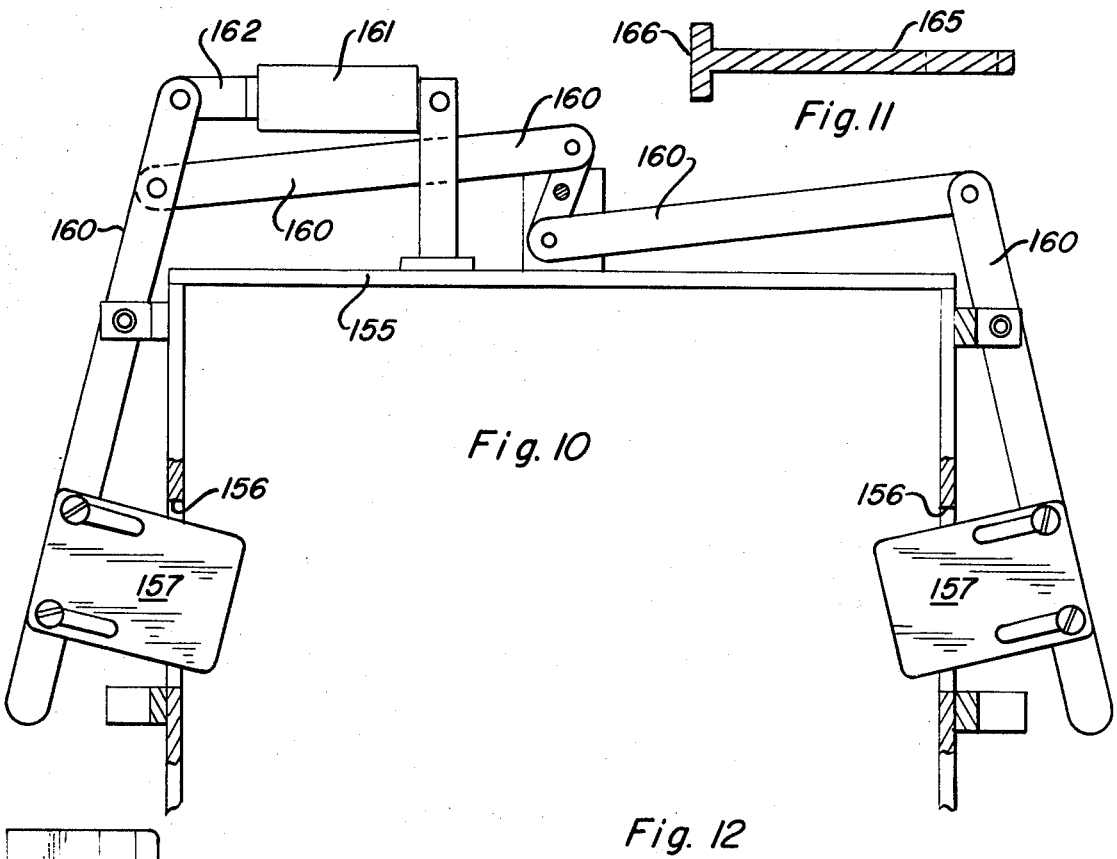
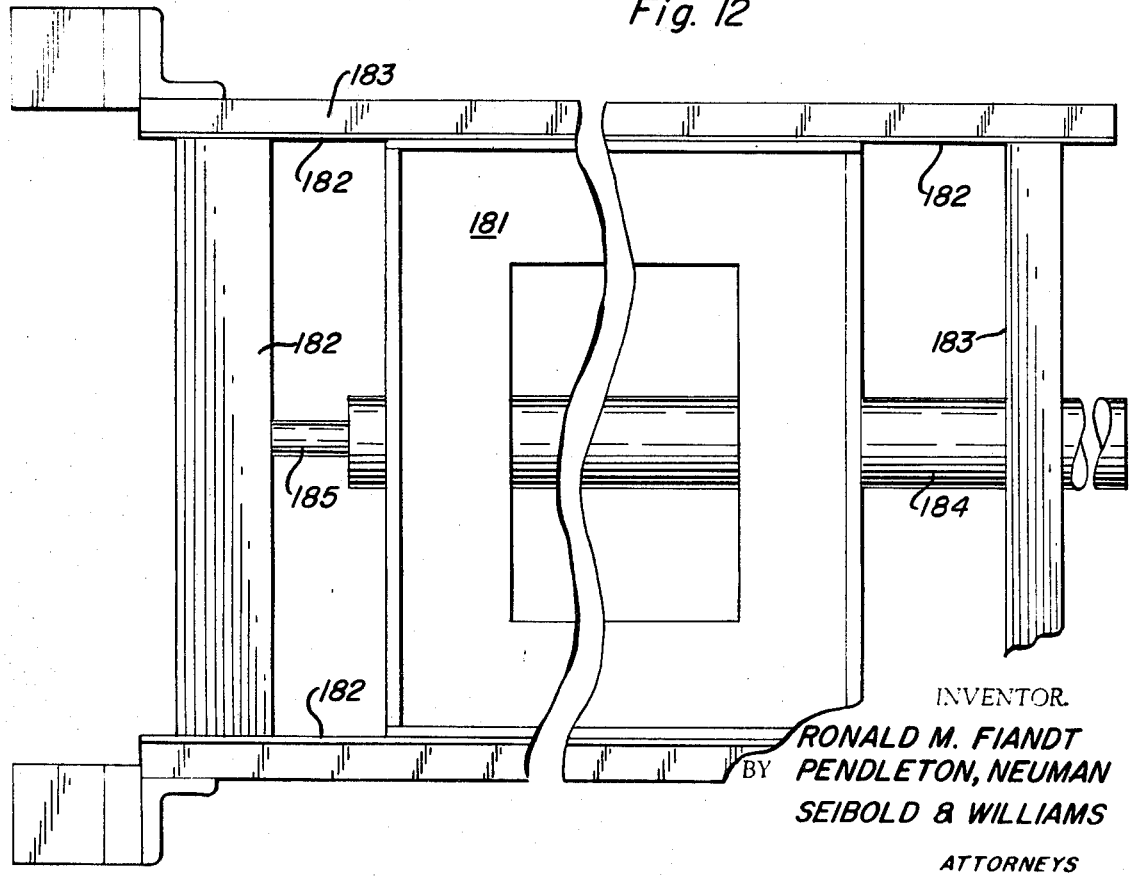

United States Patent Office 3,686,056
Patented Aug. 22, 1972

3,686,056
BATTERY CONTAINER HEAT
SEALING APPARATUS
Ronald Maynard Fiandt, Menomonee Falls, Wis., assignor to Globe-Union Inc., Milwaukee, Wis.
Continuation of application Ser. No. 625,550, Mar. 23, 1967. This application July 16, 1970, Ser. No. 56,235
Int. Cl. B32b 31/20; H01m 1/02
U.S. Cl. 156—499
3 Claims

ABSTRACT OF THE DISCLOSURE

A machine for automatically sealing thermoplastic battery cases to thermoplastic battery covers. The machine incorporates a platen which heats the appropriate portions of both the battery case and cover to a plasticized state. The case and cover are brought together to form the seal.

CROSS-REFERENCES TO RELATED APPLICATIONS

This is a continuation of application Ser. No. 625,550, filed Mar. 23, 1967 which is now abandoned.

BACKGROUND

Field of the invention

This invention relates to battery manufacture and particularly to the art of sealing battery cases and covers.

Description of prior art

The typical prior art storage battery, as used for example in automobiles, includes a case and cover made of a rubber composition. Generally, the cover is secured and sealed to the case with an adhesive. With the advent of techniques for fabricating battery cases and covers from thermoplastics such as polypropylene, it is possible to heat-seal the case and cover.

SUMMARY OF THE INVENTION

It is therefore a principal object of the present invention to provide a novel machine for heat-sealing thermoplastic battery cases and covers.

It is a further object of the present invention to provide a heat-sealing machine which can be used in an assembly line production of batteries.

A machine constructed according to the present invention includes a mechanism for bringing a heat platen, preferably maintained at a temperature of about 800° F., into contact with either one or both of the battery case and cover. The platen is preferably designed to contact all of the areas along which the seal is formed and for this reason the platen may have a number of raised portions which reach into recesses normally provided in the battery covers. The machine includes means for bringing the case and cover together to form the seal after the platen is removed. Automatic case and cover supply mechanisms may be included so the machine may be used in an assembly line operation.

BRIEF DESCRIPTION OF THE DRAWINGS

A more detailed description of the present invention will be given with reference to the accompanying drawings in which FIG. 3 is a top view of a portion of the machine shown in FIG. 1; FIG. 5 is a top view of another portion of the machine shown in FIG. 1; FIG. 6 is a partial sectional view of the portion of the machine shown in FIG. 5 together with a cross sectional view of a portion of a battery case and cover; FIG. 10 is a top sectional view of another portion of the machine shown in FIG. 1; FIG. 11 is a partial sectional view of another portion of the machine shown in FIG. 1; and FIG. 12 is a top view of another portion of the machine shown in FIG. 1.

Figure 1:
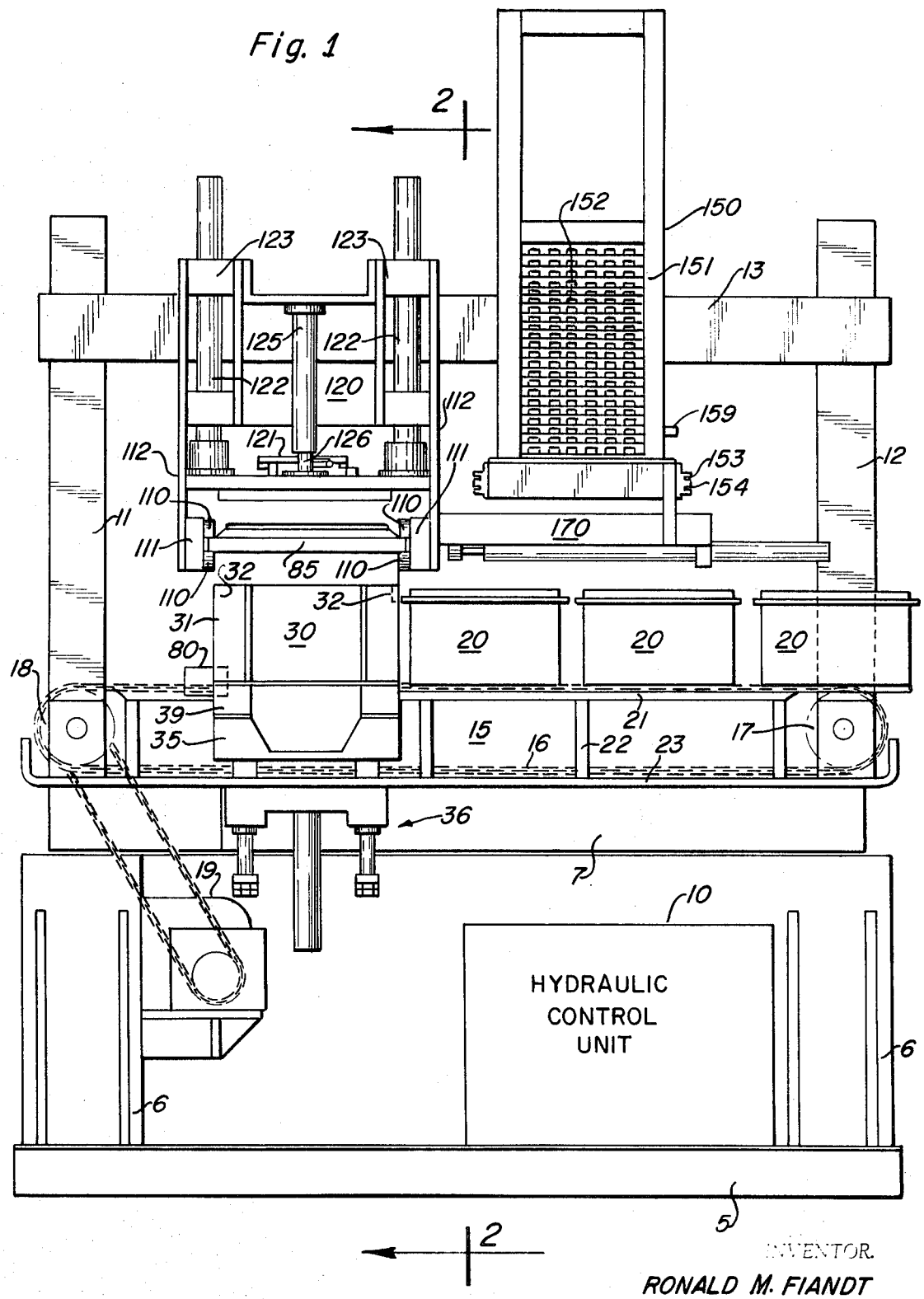
FIG. 1 is a front view of a preferred embodiment of a machine constructed according to the present invention.
Figure 2:
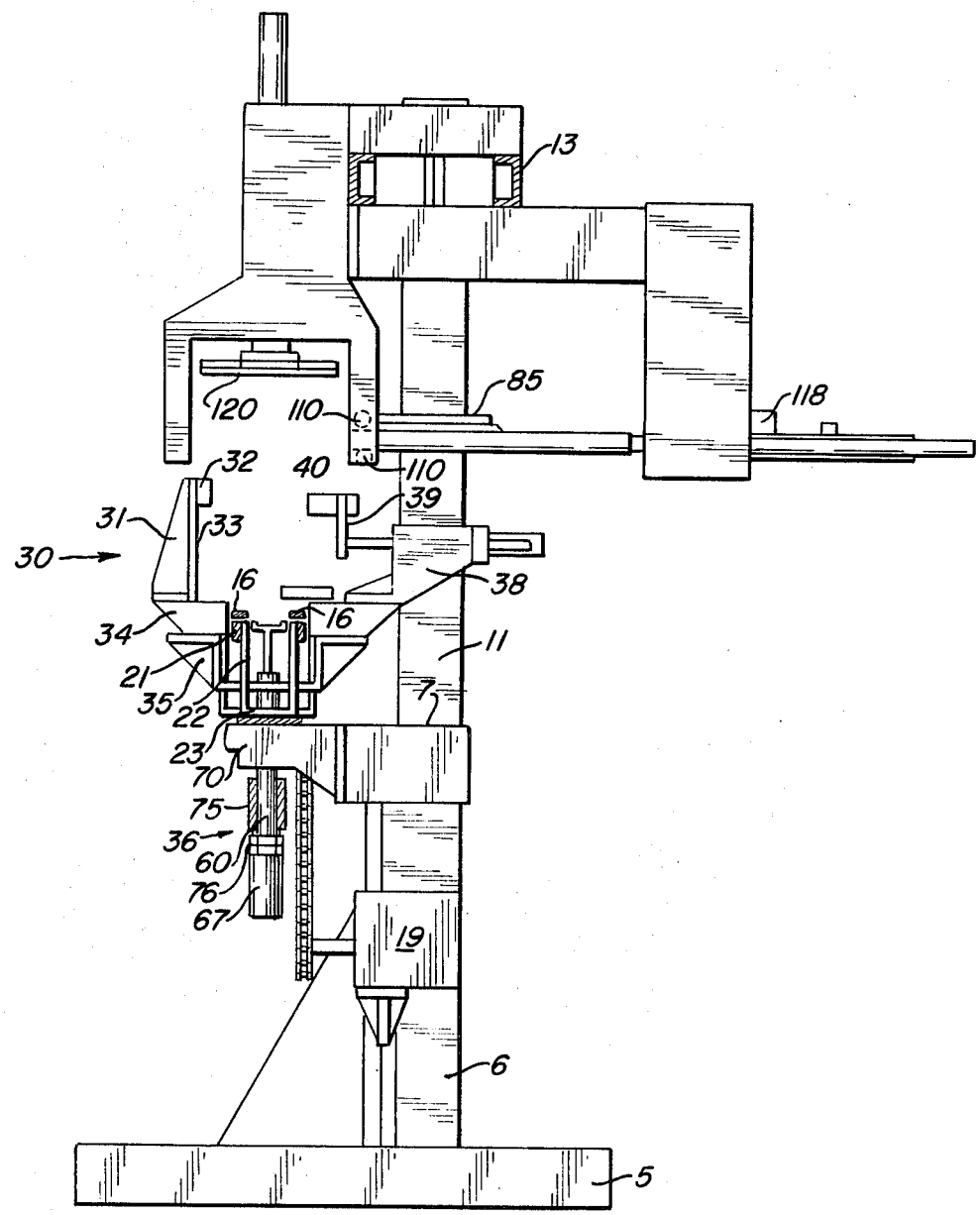
FIG. 2 is a sectional side view of the machine taken along line 2—2 in FIG. 1.

The drawings are intended to illustrate the novel features of the machine. Conventional apparatus which forms a part of the machine has not been illustrated in detail. For example, the machine operation is controlled by a hydraulic control system which is illustrated in block form in FIG. 1. The details of the control system form no part of the present invention and are well within the present state of the art. Also, all the hydraulic cylinders illustrated in the various drawings may be conventional two-way cylinders in which positive pressure is applied to move the piston in either of two directions.

DESCRIPTION OF THE PREFERRED EMBODIMENT

Machine construction

The supporting structure for the machine includes a base 5, two vertical legs 6, a horizontal support 7, two cylindrical columns 11, 12 and a top beam 13. A conveyor system 15 is supported between the two sides of the machine and includes two parallel chains 16 secured to four sprockets 17, 18, two of which 18 are driven by a motor 19. The chains 16 carry battery cases 20 from right to left through the machine along a supporting structure including two horizontal bars 21, supporting brackets 22, and a base plate 23.

About two-thirds distance along the chains 16 there is a battery case clamp and lift mechanism 30 which includes a front plate 31 with two arms 32 projecting from its sides and a face 33 against which the battery case is pressed in the clamp operation. The front plate 31 is adjustably mounted on a base 34 including a bottom plate 35 attached to the movable piston of a hydraulic lift mechanism 36. The base 34 adjustably supports a rear bracket 38 which supports a movable fork 39 having two arms 40 for accurately locating the battery case and pushing it against the face 33 of the front plate 31. A top view of the bracket 38 appears in FIG. 3. The fork 39 is rigidly secured to two cylinders 42 which pass through suitable guide holes 43 in the bracket 38. The fork 39 is actuated to move toward or from the front plate 31 by a hydraulic cylinder 45 which is attached to the fork 39 by suitable means 50 and is operated by the hydraulic control unit 10.

Figure 4:
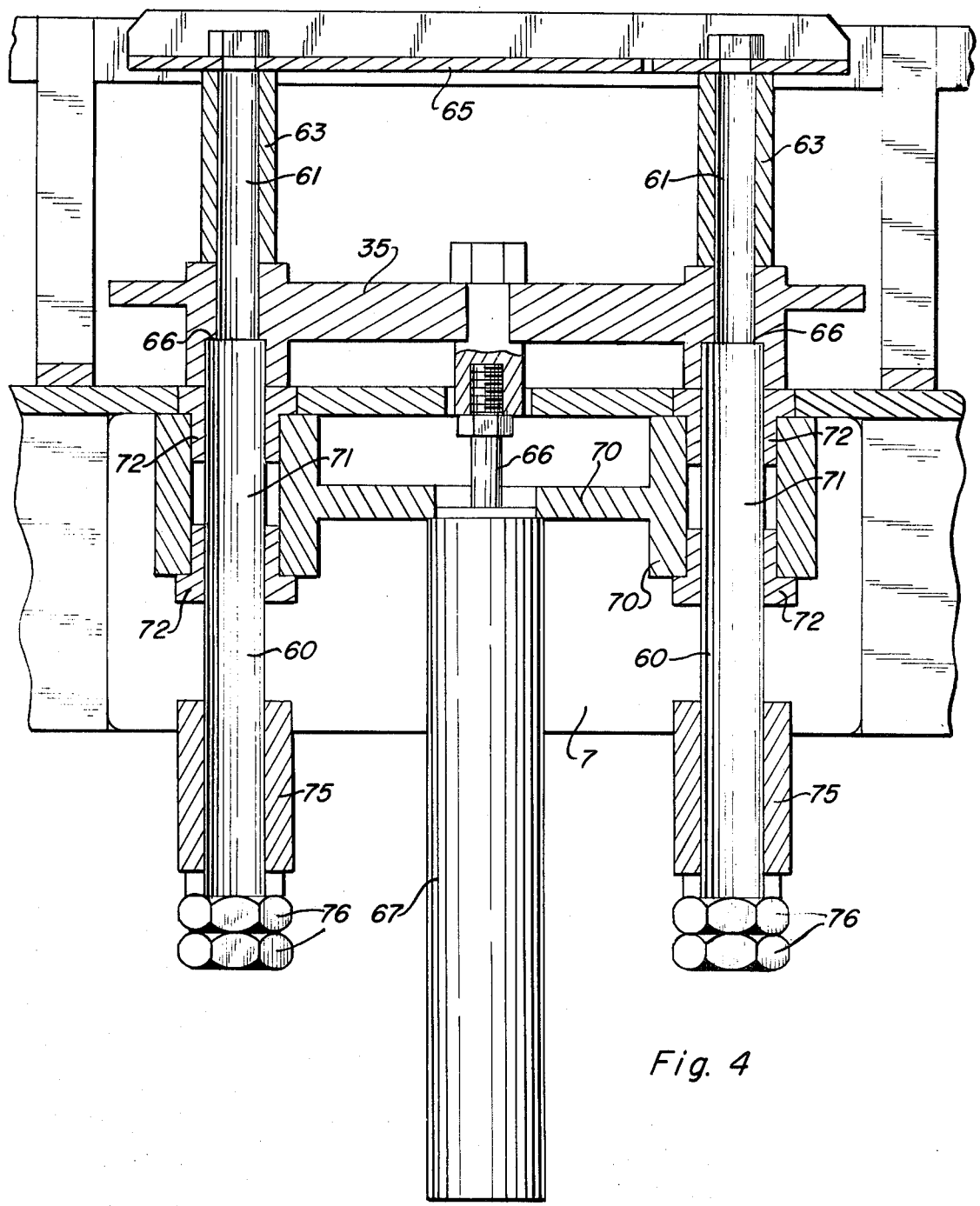
FIG. 4 is a front sectional view of another portion of the machine shown in FIG. 1.

The hydraulic lift mechanism 36 is shown in detail in the sectional view of FIG. 4. The mechanism includes two guide rods 60 each having a relatively narrow section 61 rigidly secured to both the bottom plate 35 and another plate 65. Two collars 63 surround the narrow sections 61 and abut both the plates 35, 65. A shoulder 66 on each of the rods 60 abuts a recess in the plate 35 to provide a rigid connection. The bottom plate 35 is attached to the movable piston 66 of a hydraulic cylinder 67 which is attached to the horizontal support 7 through a bracket 70. The guide rods 60 each include a section 71 which is slidably mounted in the bracket 70 with appropriate bushings 72. Two collars 75 are provided on the ends of the cylinders 60 to limit the upward motion of the mechanism. The maximum amount of lift is adjustable by adjusting nuts 76 positioned at the ends of the cylinders 60.

Referring again to FIG. 1, a limit switch 80 is provided on the left-hand side of the clamping mechanism 30. The limit switch is normally off, but it is actuated when a battery case 20 comes in contact with it. Upon contact, the limit switch shuts off the motor 19 and supplies a signal, in a conventional manner, to the hydraulic control unit 10 which actuates the clamping mechanism 30. The limit switch 80 provides a rough positioning for the battery case in the clamping mechanism 30. The fork 39 with its two arms 40 provides the accurate positioning needed for the heating operation.

Just above the clamping mechanism 30, a slidable heat platen 85 is positioned. A top view of the platen and the mechanism which operates it is given in FIG. 5. A cross sectional view of the platen 85 in contact with a battery case 95 and cover 96 is given in FIG. 6. The platen 85 includes a Meehanite casting 86 with a relatively flat bottom surface 87 and a raised top surface 88 with a plurality of stainless steel bands 89 positioned in raised portions 90. The bottom surface 87 is relatively flat to permit close engagement with the top of a battery case, while the top surface 88 includes the stainless steel bands 89 to permit engagement with the top portions of the recesses 91 which are formed in the bottom of the covers of most batteries manufactured today. The raised portions 90 provide the heat conduction necessary to maintain the ends of the bands 89 at the desired temperature. Within the Meehanite casting 86 are a plurality of conventional cartridge-type heating elements (not shown) which heat the casting 86 and the stainless steel bands 89 to a temperature of approximately 800° F. This temperature, which is well above the melting point of polypropylene, has been found to keep the platen 85 clean in that it prevents the polypropylene from sticking to the platen 85. The temperature of the platen need not be this high for adequate operation. All that is required is that the case and cover be plasticized before being brought together. (The term "plasticized" is used herein to define a softened condition of the material which enables a seal to be formed when two pieces are brought together.) The temperature of 800° F. has been found especially suitable with a composition having the following properties.

(1) a specific gravity of .85 to 1.05;

(2) a tensile yield strength (at 2 inches per minute on a ⅛ inch thick specimen) of approximately 4,000 p.s.i. when tested in accordance with ASTM test method D638–61T;

(3) a modulus in flexure (at 0.05 inch/minute on a ⅛ inch thick specimen) of approximately 180,000 p.s.i. when tested in accordance with ASTM test method D790–63; and (4) a Rockwell hardness range of 63 to 95 when tested in accordance with ASTM test method D785–60T.

The Meehanite casting 86 is secured by suitable fasteners 100 to a support member 101 which is rigidly secured to two cylinders 102 passing through appropriate bushings 103 in a bracket 104 rigidly attached to the supporting structure of the machine. A hydraulic cylinder 105 is rigidly secured to the supporting member 104 by a bracket 106 and has a movable piston 108 which is attached to the support 101. Thus, by supplying pressure to the cylinder 105 in a conventional manner, the platen 85 is moved to or from its forward position.

As shown in FIG. 1, the heat platen 85 moves on four rollers 110 rotatably attached to suitable mounting members 111 which are attached to a bracket 112 secured to the horizontal supporting beam 13 of the machine. In its forward position, the heat platen 85 is immediately over the clamping mechanism 30 while in its rearward position the heat platen 85 is completely out of the way of the clamping mechanism 30 so that a battery case clamped in the mechanism 30 can be raised to engage a cover which is positioned above the heat platen 85 as described below. A switch 118 is closed when the platen 85 reaches its forward position.

Above the clamping mechanism 30 and the heat platen 85 is a cover pickup mechanism 120. The pickup mechanism includes a holding mechanism 121 (shown in detail in FIGS. 7 and 8) which is rigidly attached to two cylinders 122 slidably mounted in appropriate supports 123 which are rigidly secured to the supporting structure of the machine. A hydraulic cylinder 125 is connected to the supporting structure of the machine and has a movable piston 126 which is attached to the holding mechanism 121.

Figure 7:
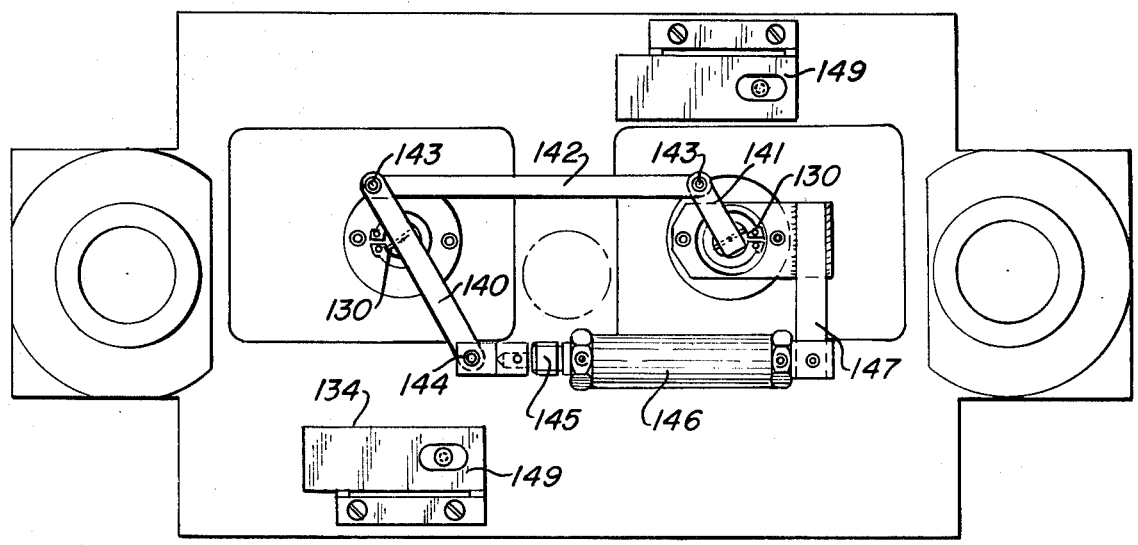
FIG. 7 is a top view of another portion of the machine shown in FIG. 1.
Figure 8:
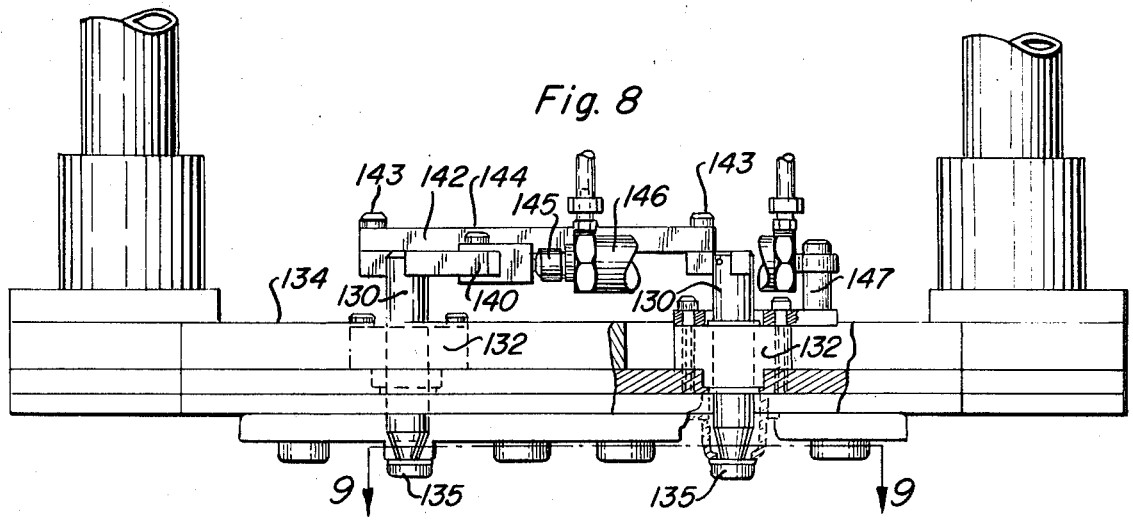
FIG. 8 is a front view of the portion of the machine shown in FIG. 7.
Figure 9:
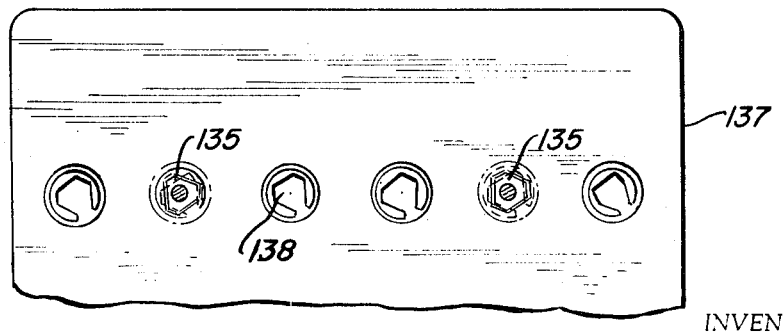
FIG. 9 is a top view of a typical battery cover.

Referring to the top and front views of FIGS. 7 and 8, respectively, the holding mechanism includes two cylinders 130 rotatably mounted in suitable bushings 132 which are rigidly secured to a base plate 134. The lower portion of each of the cylinders includes a head 135 which is adapted to fit through a venting port of the battery cover and, upon rotation, to hold the battery cover so that it may be moved along with the holding mechanism. This is best seen in FIG. 9 which shows the two heads 135 of the cylinders 130 in their locked positions with respect to a battery cover 137. The two heads 135 have approximately the same shape as the openings 138 in the battery vents to enable easy insertion. After the heads 135 are inserted, they are rotated slightly as indicated in FIG. 9.

The rotation of the cylinders 130 is accomplished through a lever system best shown in FIG. 7. Both cylinders 130 are rigidly attached to respective arms 140, 141 which are connected together through a suitable link 142 with rotatable connections 143. One of the arms 140 is also connected through a rotatable connection 144 to the movable piston 145 of a hydraulic cylinder 146 which is rigidly secured to a bracket 147 mounted on the base plate 134 of the pickup mechanism. When suitable pressure is applied through the input to the cylinder 146 the piston 145 is extended and the heads 135 rotate to their unlocked position. Two microswitches 149 (not shown in FIG. 8) positioned on the plate 134 are closed when a cover is properly positioned on the holding mechanism.

Referring again to FIG. 1 positioned to the right of the pickup mechanism 120 are a cover supply mechanism 150 and a cover transfer mechanism 170. The cover supply mechanism includes a container 151 in which a plurality of covers 152 are positioned and two lever mechanisms 153, 154 for selectively dropping the covers 152 onto the transfer mechanism 170 below. A switch 159 is closed each time a cover passes it to indicate to the control unit 10 that a cover has been dropped.

The lower lever system 154 is shown in detail in the top sectional view of FIG. 10. The other system 153 is essentially the same with one difference indicated below. The lower mechanism 154 includes a rectangular bracket 155, larger than the covers 152, with two slots 156 for receiving insert plates 157. A system of levers 160 connected to a suitable hydraulic cylinder 161 controls the operation of the insert plates 157. When the piston 162 of the cylinder 161 is extended, the plates 157 are urged toward each other to support a cover positioned immediately above the plates 157. When the piston 162 is in its closed position the plates 157 retract and the cover they were supporting drops.

The upper lever system 153 is essentially the same as that shown with the exception of the insert plates. A cross section of one insert plate 165 used in the upper lever system 153 is shown in the sectional side view of FIG. 11. The insert plate 165 differs from the plate 157 in that it includes a wide flat end 166. Instead of fitting under the covers 152 as the insert plates 156 of the lower lever system 154, the flat ends 166 of these plates 165 abut the sides of one of the covers 152 under sufficient pressure to hold it and the covers above it. When the plates 165 are in their extended position, they release the cover they were holding.

The two lever systems 153, 154 are spaced apart a distance which is approximately the thickness of one cover. The two systems 153, 154 cooperate to drop the covers 152, one at a time, from the container 151 by operating in series. The upper lever system 153 is first actuated so that the insert members 165 (FIG. 11) are in their extended position thereby releasing the covers so that the lowest one rests on the lower insert members 157. The upper lever system 153 is then closed and the insert members 165 grasp the next cover to hold it and all the covers above it in place while the lower lever system 154 is actuated so that the insert plates 157 are moved to their extended position thereby dropping the cover onto the tray of the transfer mechanism 170.

The cover transfer mechanism 170 positioned below the cover supply mechanism 150 operates to transfer the cover dropped onto it from the supply mechanism to a position immediately over the clamping mechanism 30. A top view of the transfer mechanism is shown in FIG. 12. This mechanism includes a tray 181 which is rigidly attached to a bracket 182. The bracket 182 is slidable in a support 183 to which a hydraulic cylinder 184 is attached. The piston 185 of the cylinder 184 is attached to the bracket 182. When the hydraulic cylinder 184 is actuated, the tray 181 moves from a position immediately under the cover supply mechanism 150 to a position immediately above the case clamping mechanism 30.

The various mechanisms are operated in a sequence described below by the hydraulic control unit 10. The design of the control unit 10 is well within the present state of the art and its details are not set forth here. Also, the electrical wiring from the various switches to the control unit 10 is conventional and has not been shown.

MACHINE OPERATION

Battery cases 20 are fed into the machine from the right by any suitable means, as for example from the conveyor belt of a previous processing machine. The conveyor chains 16 bring the first case into the clamping mechanism 30. The case contacts and closes the limit switch 80 to stop the motor 19 and to supply a signal to the hydraulic control unit 10 which actuates the clamping mechanism cylinder 45 to clamp the battery case.

With the case clamped in position, a battery cover 152 is dropped onto the tray 181 of the transfer mechanism 170 by actuation of the levers 153, 154 of the cover supply mechanism. The switch 159 in the cover container 151 indicates that a cover has been dropped and sends a signal to the hydraulic control unit 10 which then actuates the hydraulic cylinder 184 operating the cover transfer mechanism. The cover is thus transferred to a position immediately above the case in the clamping mechanism 30. The cover is picked up and locked by the cover pickup mechanism 120. The locked condition is indicated to the control unit 10 by the two switches 149. The cover transfer tray 181 is then returned to its position beneath the cover supply and the next cover is dropped onto the tray.

With the cover locked on the cover pickup, the heat platen 85 comes forward on the rollers 110 to the position between the battery case and the battery cover. The switch 118 at the rear of the heat platen mechanism closes when the platen reaches its forward position and supplies a signal to the hydraulic control unit 10 which then actuates both the case lift mechanism 60 and the cover pickup mechanism 120. Thus, the top portions of the walls of the case and the mating bottom portions of the cover are brought in contact with the heat platen as illustrated in FIG. 6. The particular pressure with which the case and cover contact the heat platen 85 must be determined experimentally for the particular case being used. The heat platen 85, which is approximately 800° F., engages both the cover and case with sufficient pressure to plasticize the thermoplastic, without destroying either the cover or case. It is preferred that the cover contact the heat platen 85 for a period slightly less than that for the case. Generally speaking, the case may contact the platen 85 for approximately two seconds while the cover may contact the platen 85 for approximately one second. Again, these figures must be determined experimentally for the particular case under construction, and the one-second and two-second figures are given solely by way of example. The 800° F. temperature is also exemplary and is in no sense limiting. It has been found that a temperature of approximately 800° F., while well above the melting point of the thermoplastics commonly employed in battery case construction, is helpful in keeping the heat platen 85 clean. At this temperature very little, if any, thermoplastic will remain on the heat platen 85. Also, the thermoplastic at the cover bottom will remain in a plasticized condition for a longer period of time than it would at a lower temperature. This increases the probability of a reliable seal.

After the cover and case are heated to a plasticized condition, they are separated from the heat platen 85 and the heat platen 85 retracts. The cover and case are then joined together under suitable pressure to form a reliable seal. Either one or both of the case and cover may be moved in this operation. In the present machine only the cover is moved to contact the case. The particular pressure of the contact is again a matter of experimentation for the particular type cover. With the seal between the case and cover completed, the cover pickup mechanism releases the cover and returns to its original position. The clamp mechanism 30 is actuated to release the battery case and the conveyor motor 19 is started to remove the battery case from the clamp mechanism 30 and move the next battery case into position to initiate the next cycle of operation.

The above described sequence of operation is given by way of example only. Other sequences may also be used.

While a particular embodiment of a machine constructed according to the present invention has been described in detail, it is not intended that the invention be limited to this particular embodiment. The scope of the invention and the protection sought are defined by the following claims.

I claim:

1. A machine for sealing thermoplastic battery cases to thermoplastic battery covers comprising:
   (a) a conveyor for moving battery cases;
   (b) a clamp means positioned along said conveyor to clamp individual battery cases;
   (c) means for supplying a plurality of covers;
   (d) holding means for sequentially receiving individual battery covers from said supply means and for holding said covers above said clamp means;
   (e) a heat platen which can be heated to a temperature above the temperature at which said thermoplastic platicizes;
   (f) means for moving said heat platen to a position above the position of said clamp means;
   (g) means for moving said case and cover into engagement with said platen and for disengaging them from said platen; and
   (h) means for moving said case and cover, while in the plasticized condition, into engagement with one another to form said seal.

2. The machine of claim 1 wherein said battery cover includes a portion having recesses which receive wall portions of said battery case in said sealing operation and said platen includes a first relatively flat surface for engaging said battery case and a second surface having bands for reaching into the upper portions of said recesses in the cover.

3. The machine of claim 2 wherein said bands are mounted on projections extending from said heat platen.

References Cited
FOREIGN PATENTS

| | | | |
|---|---|---|---|
| 1,316,806 | 12/1962 | France | 136—170 |
| 1,328,722 | 4/1963 | France | 136—170 |
| 1,476,366 | 2/1966 | France | 136—170 |

DONALD L. WALTON, Primary Examiner

U.S. Cl. X.R.

156—566; 53—39; 136—170, 176